Patented Feb. 28, 1933

1,899,574

UNITED STATES PATENT OFFICE

PAUL KUBELKA, OF PRAGUE, CZECHOSLOVAKIA, ASSIGNOR TO KREBS PIGMENT & COLOR CORPORATION, OF NEWARK, NEW JERSEY, A CORPORATION OF DELAWARE

PROCESS OF PREPARING CONCENTRATED CLEAR SOLUTIONS OF TITANIUM CHLORIDE

No Drawing. Application filed February 12, 1932, Serial No. 592,658, and in Germany February 25, 1931.

The present invention relates to processes of producing clear concentrated solutions of titanium chloride in which the initial turbidity obtained by introducing titanium chloride into water or an acid solution is redissolved by the addition of more titanium tetrachloride.

For the economical preparation of titanium dioxide pigments from titanium chloride solutions by hydrolysis and subsequent calcination, it is necessary to start with solutions of relatively high concentration in titanium.

The treatment of ilmenite with hydrochloric acid at elevated temperature produces, to be sure, solutions of considerable $TiO_2$ concentration but this method of procedure requires the use of a very large excess of hydrochloric acid and produces strongly acid solutions containing much iron chloride, which are not very suitable for subsequent treatments.

Similarly dissolving hydrolytically precipitated titanium oxygen compounds in excess hot hydrochloric acid cannot by its very nature be considered for the economical preparation of titanium chloride as a starting material for making titanium dioxide. Attempts to prepare such solutions from anhydrous titanium tetrachloride, which is obtained on a large scale from ilmenite or other titanium containing raw material by treatment with chlorine at elevated temperature, have failed so far.

Strongly turbid solutions and precipitates of titanium oxychloride or titanium oxygen compounds are obtained when titanium tetrachloride is added to water even at relatively low concentration. One has, therefore, to discontinue before turbidity and precipitation takes place dissolving the tetrachloride in water, if clear solutions are to be obtained, as otherwise undesired solutions of very low titanium chloride concentration would only be obtained.

I have found that the turbidity and precipitates obtained by dissolving titanium tetrachloride in water can be redissolved if additional amounts of titanium tetrachloride are added to such turbid solutions containing precipitated titanium compounds. One obtains in this manner solutions of a concentration corresponding, for instance, to 550 grams $TiO_2$ and 600 grams HCl per liter.

Investigation of these conditions has shown that the original turbidity and precipitates are caused by the great rise in temperature, which occurs on dissolving titanium tetrachloride in an aqueous solvent. If no cooling is provided, the temperature of the solvent increases to over 100° C. until a concentration corresponding to 130 grams titanium compound figured as $TiO_2$ and 250 grams HCl per liter is obtained. At this point hydrochloric acid gas is evolved from the solution and turbidity and precipitation start to be noticed, which both increase as the temperature further increases. If one continues then to add titanium tetrachloride, the temperature decreases and the precipitates gradually redissolve and a clear concentrated titanium chloride solution is obtained in which further amounts of titanium tetrachloride dissolve, forming a clear solution. The decrease of the temperature during this further dissolving of titanium chloride therein is due to the heat of evaporation of the hydrogen chloride being greater than the heat of solution of the titanium tetrachloride. Due to the boiling off of the hydrogen chloride, the clear concentrated solutions contain tetravalent titanium and chlorine in a ratio of 1 to less than 4, for instance 1:2.7.

While I can start the dissolving of the titanium chloride in water, it is preferable to use a dilute hydrochloric acid as the solvent. In this manner the boiling off of the hydrogen chloride starts at a lower temperature and one obtains a lower maximum temperature. In this case also the turbidity and precipitates are of lesser magnitude as by dissolving from the start in pure water. A convenient solvent for this operation is the spent acid obtained in the hydrolysis of titanium chloride solutions, the hydrogen chloride content of which is recovered during the solution process as concentrated hydrogen chloride gas.

The solution process is conveniently and preferably carried out while agitating the solvent by the aid of stirring devices, etc. The loss of titanium chloride by evaporation due to local overheatings is in this manner reduced to an acceptable low amount.

The present process makes it possible to prepare clear titanium chloride solutions of any desired concentration of $TiO_2$ up to amounts which could not be previously obtained by such a simple method. It permits thereby an appreciable simplification and cheapening of the process of preparing titanium dioxide from titanium tetrachloride.

I claim:

1. In a process of preparing an aqueous solution of titanium chloride comprising adding titanium tetrachloride to an aqueous solvent, wherein the solution becomes turbid and precipitates titanium oxygen compounds at low concentrations, the step of adding titanium tetrachloride to said turbid solution.

2. The process of preparing a clear, concentrated aqueous solution of titanium chloride which comprises adding titanium tetrachloride to an aqueous, hot suspension of titanium oxychloride in an aqueous titanium chloride solution, said suspension containing at least 250 gr. HCl, free and combined and 130 gr. titanium compound figured as $TiO_2$ per liter.

In testimony whereof, I affix my signature.

PAUL KUBELKA.